United States Patent
Eschelbeck et al.

(10) Patent No.: US 6,611,869 B1
(45) Date of Patent: Aug. 26, 2003

(54) SYSTEM AND METHOD FOR PROVIDING TRUSTWORTHY NETWORK SECURITY CONCERN COMMUNICATION IN AN ACTIVE SECURITY MANAGEMENT ENVIRONMENT

(75) Inventors: Gerhard Eschelbeck, Santa Clara, CA (US); Andrea Villa, Ben Lomond, CA (US)

(73) Assignee: Networks Associates, Inc., Santa Clara, CA (US)

( * ) Notice: Subject to any disclaimer, the term of this patent is extended or adjusted under 35 U.S.C. 154(b) by 0 days.

(21) Appl. No.: 09/540,821

(22) Filed: Mar. 31, 2000

Related U.S. Application Data

(60) Provisional application No. 60/161,968, filed on Oct. 28, 1999.

(51) Int. Cl.[7] .............................................. G06F 15/16
(52) U.S. Cl. ...................... 709/228; 709/219; 709/225; 709/229; 707/9; 707/10; 713/155; 713/168; 713/176
(58) Field of Search ................................. 709/219, 225, 709/203, 229, 228; 713/166, 168, 152, 155, 178; 707/9, 10

(56) References Cited

U.S. PATENT DOCUMENTS

| | | | |
|---|---|---|---|
| 5,432,932 A | | 7/1995 | Chen et al. |
| 5,655,081 A | | 8/1997 | Bonnell et al. |
| 5,872,931 A | | 2/1999 | Chivaluri |
| 5,958,010 A | | 9/1999 | Agarwal et al. |
| 6,233,577 B1 | * | 5/2001 | Ramasubramani et al. .... 707/9 |
| 6,332,163 B1 | | 12/2001 | Bowman-Amuah |
| 6,367,009 B1 | * | 4/2002 | Davis et al. ................ 713/166 |
| 6,430,688 B1 | * | 8/2002 | Kohl et al. ................ 713/156 |
| 6,516,316 B1 | * | 2/2003 | Ramasubramani et al. .... 707/9 |

OTHER PUBLICATIONS

A. Osborne & J.D. Myers, "A Methodical Approach to Remote IP Stack Identification," Network Associates, Inc., Santa Clara, California (1999).
M. Pietrek, "Learn System–level Win32 Coding Techniques by Writing an API Spy Program," vol. 9, No. 12, Microsoft Systems Journal, Microsoft Press (Dec. 1994).
T. Fraser et al., "Hardening COTS Software with Generic Software Wrappers," Proc. of the 1999 IEEE Symp. on Security and Privacy, IEEE, Inc. (1999).
R. Orfali et al., "Client/Server Survival Guide," pp. 127–156, 179–201, John Wiley & Sons, Inc. (3d ed. 1999).

* cited by examiner

*Primary Examiner*—David Wiley
*Assistant Examiner*—Phuoc Nguyen
(74) *Attorney, Agent, or Firm*—Patrick J. S. Inouye; Christopher J. Hamaty

(57) ABSTRACT

A system and a method for providing trustworthy network security concern communication in an active security management environment are described. A digital certificate including a validated server identifier for a server system is stored on a client system. A digital certificate including a validated client identifier for the client system is stored on the server system. A communications session between the client system and the server system is established. The communications session includes a secure socket connection authenticating each of the client system and the server system using the stored client digital certificate and the stored server digital certificate. A certogram is generated upon the occurrence of a network security concern on the client system. The certogram encloses a notification of the network security concern occurrence and a suggested action responsive thereto within the certogram. The certogram is processed on the server system. The certogram is validated using the validated client identifier stored in the client digital certificate. The network security concern notification and the suggested action enclosed within the validated certogram are evaluated.

25 Claims, 15 Drawing Sheets

| | | |
|---|---|---|
| PRODUCT_VERSION | alpha-numeric | ← 121 |
| PRODUCT_ENGINE_VERSION | alpha-numeric | ← 122 |
| PROTOCOL_VERSION | alpha-numeric | ← 123 |
| ACTION | integer | ← 124 |
| TIME | alpha-numeric | ← 125 |
| PROTOCOL_ID | integer | ← 126 |
| VULNERABILITY_ID | integer | ← 127 |
| SEVERITY | integer | ← 128 |
| PORT | integer | ← 129 |
| MACHINE | integer | ← 130 |
| SERVER SYSTEM_MACHINE | integer | ← 131 |
| SERVER SYSTEM_PORT | integer | ← 132 |
| CLIENT SYSTEM_MACHINE | integer | ← 133 |
| CLIENT SYSTEM_PORT | integer | ← 134 |
| SHORT_DESCRIPTION | alpha-numeric | ← 135 |
| VULNERABILITY_DESCRIPTION | alpha-numeric | ← 136 |
| SECURITY_CONCERNS | alpha-numeric | ← 137 |
| SUGGESTIONS | alpha-numeric | ← 138 |
| OTHER_INFORMATION_SOURCES | alpha-numeric | ← 139 |
| HIGH_LEVEL_DESCRIPTION | alpha-numeric | ← 140 |
| MACHINE_SIGNATURE | alpha-numeric | ← 141 |
| OWNER_NAME | alpha-numeric | ← 142 |

SYSTEM AND METHOD FOR PROVIDING TRUSTWORTHY NETWORK SECURITY CONCERN COMMUNICATION IN AN ACTIVE SECURITY MANAGEMENT ENVIRONMENT

CROSS-REFERENCE TO RELATED APPLICATION

This patent application claims priority under 35 U.S.C. § 119(e) to provisional patent application Ser. No. 60/161,968, filed Oct. 28, 1999, the disclosure of which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates in general to network security concern management and, in particular, to a system and method for providing trustworthy network security concern communication in an active security management environment.

BACKGROUND OF THE INVENTION

Information networks interconnecting a wide range of computational resources have become a mainstay of corporate enterprise computing environments. Typically, several host computer systems are interconnected internally over an intranetwork to which individual workstations and network resources are connected. These intranetworks, also known as local area networks (LANs), make legacy databases and information resources widely available for access and utilization throughout the corporation. These same corporate resources can also be interconnected to wide area networks (WANs), including public information internetworks such as the Internet, to enable internal users access to remote computational resources, such as the World Wide Web ("Web"), and to allow outside users access to select corporate resources for the purpose of completing limited transactions or data transfer.

However, allowing outside users access to all internal corporate resources is risky and generally ill-advised. One approach to limiting access, and consequently, averting potential harm, structures a corporate intranetwork into separate network subdomains. For instance, network servers for providing Web content or file downloads, are located in an external subdomain while corporate servers containing non-public information are located in an internal subdomain. Thus, outside users are only able to access non-sensitive computing resources available in the external subdomain.

Most internetworks and intranetworks are based on a layered network model in which a stack of standardized protocol layers cooperatively exchange information between various systems. In particular, the Transmission Control Protocol/Internet Protocol (TCP/IP) suite, such as described in W.R. Stevens, "TCP/IP Illustrated," Vol. 1, Ch. 1 et seq., Addison-Wesley (1994), the disclosure of which is incorporated herein by reference, is the most widely adopted network model. Computer systems and network devices employing the TCP/IP suite implement a protocol stack, which includes a hierarchically structured set of protocol layers beginning with the link protocol layer and proceeding upwards to the network, transport, and application protocol layers. Each protocol layer performs a set of pre-defined functions as specified by the official TCP/IP standards set forth in applicable Requests for Comment (RFC).

External and internal subdomains can be created through the use of firewalls which protect networks by filtering incoming and outgoing network traffic. Although effective at filtering out illicit requests, firewalls generally operate based on static configuration parameters loaded by a network administrator. A new generation of active security applications, such as the Net Tools Secure active security products suite, licensed by Network Associates, Inc., Santa Clara, Calif., adopt a proactive role in identifying security risks and vulnerabilities, formulating a suggested action, and, in some cases, executing the action. By design, the various components which make up such an active security products suite are distributed over the intranetwork within both internal and external subdomains. To be effective, these active security components must be able to communicate in a secure fashion. Non-secure communications create the potential for packet interception and corruption, also known as "spoofing," which could cause, for instance, a set of recommended actions being sent from one component to another to be altered and rendered useless, or worse, to cause the recipient component to unwittingly open up a security risk.

Two complementary prior art approaches to providing secure communications are the Transport Layer Security (TLS) protocol and the Secure Hypertext Transport Protocol (S-HTTP), both described in R. Orfali, "Client/Server Survival Guide," Ch. 9, John Wiley & Sons (3d ed. 1999), the disclosure of which is incorporated herein by reference. TLS creates a secured socket connection at the transport protocol layer that incorporates RSA public key authentication and encryption technologies. S-HTTP adds message-based security to ordinary HTTP packets also using RSA public key encryption and authentication. TLS provides security at the document level while S-HTTP ensures a secure communication channel. However, TLS nor S-HTTP are general purpose network security tools and neither is specifically designed to provide secure network security concern notifications and action recommendations in an active security environment.

Therefore, there is a need for an approach to providing secure communications between active security components operating in a distributed computing environment. Such an approach would guarantee the identity of the source of an active security message and the integrity of the message itself, thereby allowing proactive security measures to be exchanged and executed by distributed security application components.

SUMMARY OF THE INVENTION

The present invention provides a system and method for exchanging authenticated active security messages between a plurality of systems operating in an active security environment. Individual pairs of systems are designated as client and server systems. The client systems generate certograms upon the occurrence of a network event, upon the discovery of a weakness on a system operating within the active security environment, or similar security concern. The certograms include a suggested action to be taken responsive to the network security concern. A secure communications channel is established between the client system and a server system whereby the identity of both the client system and server system are authenticated. The certogram is processed by the server system which validates the identification of the client system and evaluates the certogram and action suggested therein.

An embodiment of the present invention is a system and a method for providing trustworthy network security concern communication in an active security management environment. A digital certificate including a validated server identifier for a server system is stored on a client system. A digital certificate including a validated client identifier for the client system is stored on the server system. A communications session between the client system and the server system is established. The communications session includes a secure socket connection authenticating each of the client system and the server system using the stored client digital certificate and the stored server digital certificate. A certogram is generated upon the occurrence of a network security concern within the active security management environment. The certogram encloses a notification of the network security concern occurrence and a suggested action responsive thereto within the certogram. The certogram is processed on the server system. The certogram is validated using the validated client identifier stored in the client digital certificate. The network security concern notification and the suggested action enclosed within the validated certogram are evaluated.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWING

FIG. 5 is a data structure diagram showing the layout of a certogram used by the system of FIG. 2;

DETAILED DESCRIPTION

Figure 1:
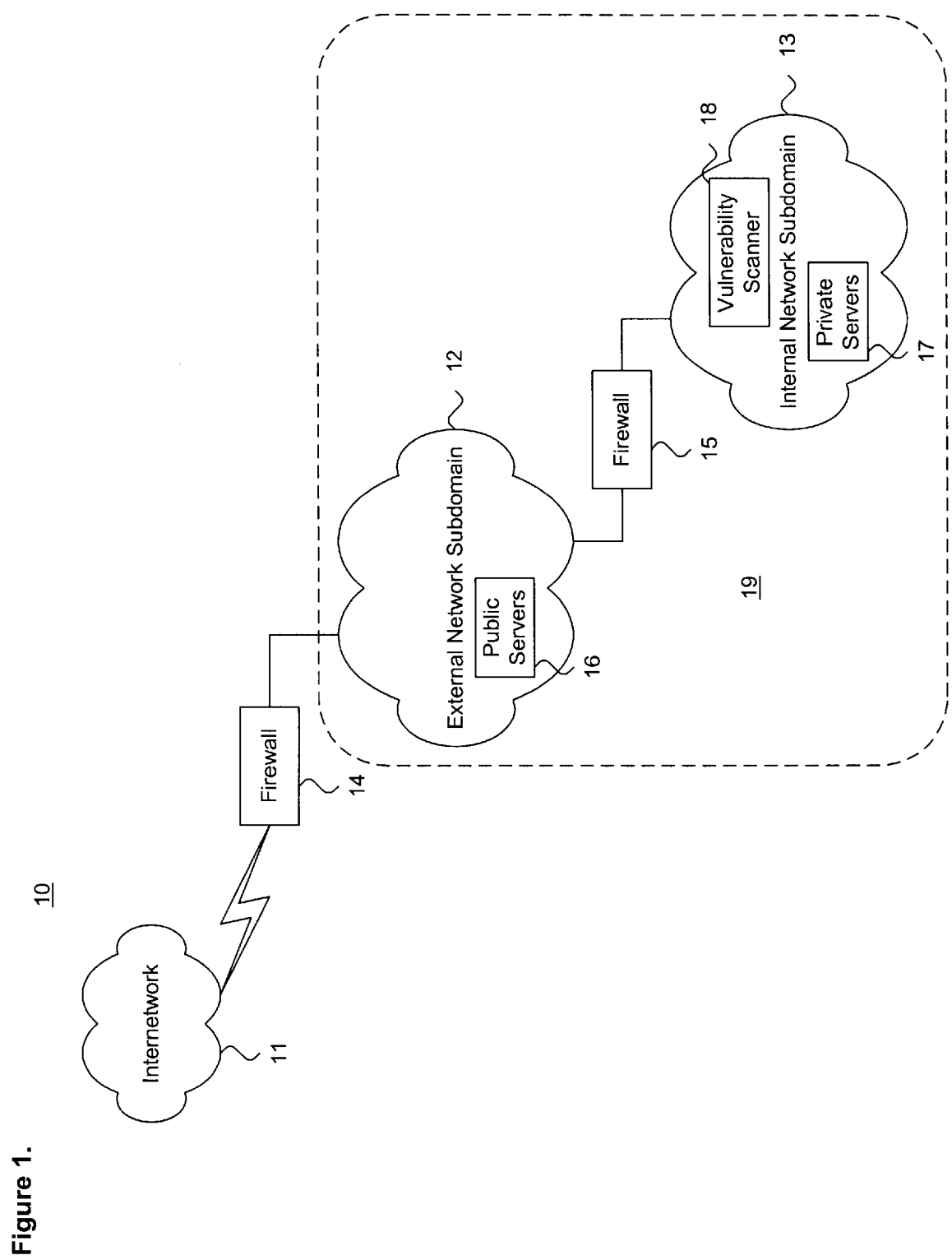
FIG. 1 is a functional block diagram showing a distributed computing environment with layered network security.

FIG. 1 is a functional block diagram showing a distributed computing environment 10 with layered network security. The distributed computing environment 10 consists of three principal, interconnected components: an internetwork 11, an external network subdomain 12, and an internal network subdomain 13. The external network subdomain 12 and internal network subdomain 13 together form an intranetwork 19, such as used for interconnecting corporate computing resources. The external network subdomain 12 includes those computing resources, including public servers 16, which are made readily accessible to the general public. Conversely, the internal network subdomain 13 includes those computing resources, including private servers 17 and a vulnerability scanner 18, which may contain sensitive information or are otherwise off-limits to public access.

For example, the vulnerability scanner 18 actively scans and analyzes the various resources on both the external network subdomain 12 and internal network subdomain 13 for security vulnerabilities or risks, policy violations, and the like, and should therefore be off-limits to the public. In the described embodiment, any security findings are actively reported, along with a suggested set of actions to be taken, to an appropriate peer security component, as further described below beginning with reference to FIG. 2.

The internetwork 11 and external network subdomain 12 are separated by an external firewall 14. Similarly, external network subdomain 12 and internal network subdomain 13 are separated by an internal firewall 15. Both external firewall 14 and internal firewall 15 act as network filters which allow or disallow entry into their respective subdomains based on security policies pre-loaded by a network administrator. External firewall 14 is configured for relaxed security whereby all users are allowed virtually unrestricted access to the public servers 16 operating within the external network subdomain 12. However, all users, except for the network administrator, are disallowed privileged access. Similarly, internal firewall 15 is configured for relaxed security, but only for outgoing traffic originating from within the internal network subdomain 13. All incoming requests originating from the external network subdomain 12 or internetwork 11 are strictly filtered to disallow unauthorized access. In the described embodiment, the internetwork 11, external network subdomain 12, and internal network subdomain 13 implement a Transmission Control Protocol/Internet Protocol (TCP/IP) network stack. Other network topologies and configurations of computational resources, including various combinations of intranetworks and internetworks, are possible.

The individual computer systems included in the intranetwork 19 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
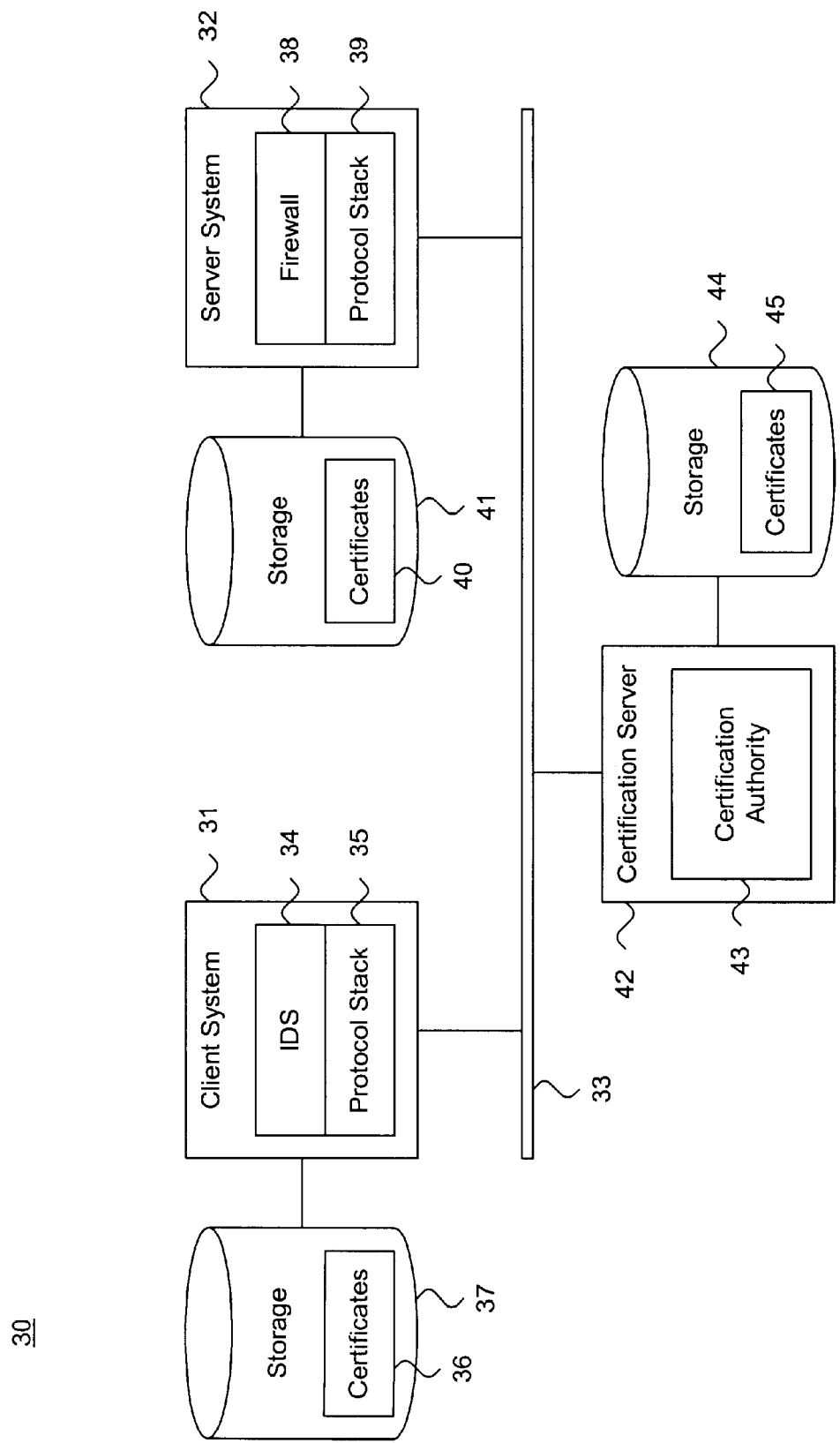
FIG. 2 is a block diagram showing a system for providing trustworthy network security concern communication in an active security management environment in accordance with the present invention.

FIG. 2 is a block diagram showing a system for providing trustworthy network security concern communication 30 in an active security management environment in accordance with the present invention. Two active security systems, client system 31 and server system 32, are interconnected via an intranetwork 33. By way of example, client system 31 executes an intrusion detection system 34 (IDS) over a network protocol stack 35 through which client system 31 accesses the intranetwork 33. Similarly, server system 32 executes a firewall 38 over a network protocol stack 39 through which server system 32 accesses the intranetwork 33. The client system 31 is located within an internal network subdomain (not shown) while the server system 32 is located within an external subdomain (not shown).

The IDS 34 actively monitors network traffic on the intranetwork 33 and generates a suggested action based on any security-related findings. An exemplary IDS 34 for use in the described embodiment is the CyberCop Monitor product, licensed by Network Associates, Inc. The firewall 38 protects the internetwork 33 from attacks and unauthorized access by users, both from within and outside of the intranetwork 33. An exemplary firewall 38 for use in the described embodiment is the Gauntlet Firewall product, licensed by Network Associates, Inc.

The vulnerability scanner 34 and firewall 38 communicate via parameterized messages, known as "certograms." The structure and content of certograms are further described below with reference to FIG. 5. A secure, authenticated communications channel is formed between the vulnerability scanner 34 and the firewall 38 using a combination of trusted digital certificates and a socket-based secure protocol stack layer. In the described embodiment, both of the respective protocol stacks 35 and 39 includes a Transport Layer Security (TLS) protocol layer over which certograms are exchanged. The TLS protocol operates below the application protocol layer and transparently provides a secured communications link upon the completion of a handshake protocol sequence.

Both client system 31 and server system 32 authenticate each other using digital certificates 36 and 40 respectively maintained in a persistent storage 37 and 41. The digital certificates 36 and 40 are obtained from a certification server 42 which acts as a local certification authority 43 within the intranetwork 33. Digital certificates 45 are maintained in a persistent storage 44 associated with the certification server 42. The certification server 42 generates new digital certificates upon the approval of a digital certificate request received from an authorized system within the intranetwork 33. In the described embodiment, X.509 digital certificates are used to guarantee the identity of the source of each certogram and that the certogram has not been tampered with by a third party. X.509 digital certificates are described in R. Orfali, "Client/Server Survival Guide," Ch. 7, John Wiley & Sons (3d ed. 1999), the disclosure of which is incorporated herein by reference. Obtaining digital certificates is further described below with reference to FIG. 8.

Operationally, the security applications, such as IDS 34 and firewall 38, are matched into client/server pairs. An individual security application can function both as a client and as a server to other security applications, but each role requires a separate authenticated communications channel.

Here, the IDS 34 monitors the intranetwork 33 and recommends actions to the firewall 38 upon the occurrence of a network event. Typically, firewalls perform packet filtering in the privileged modes of the underlying operating system and are not adapted to perform dynamic packet filtering rule reconfiguration. In the event of an Internet fragmentation attack, for example, the IDS 34 would recognize the signatures characteristic of such an attack embedded within network packets traveling over the intranetwork 33. The IDS 34 would then generate a certogram describing this network event. The certogram would identify the network event and include a suggested action for the firewall 38. Rather than attempting to dynamically reconfigure the packet filtering rules used by firewall 38, IDS 34 would merely recommend that further packets from the network address from which the attack is originating be filtered out of the intranetwork 33, thereby only adding to the list of filter-out network addresses. The certogram would be forwarded to the firewall 38 via a secure communications channel in which the IDS 34 acts as a client and the firewall 38 acts as a server. The certogram could be progressively forwarded to further security applications, such as in a further embodiment described below with reference to FIG. 6.

Figure 3:
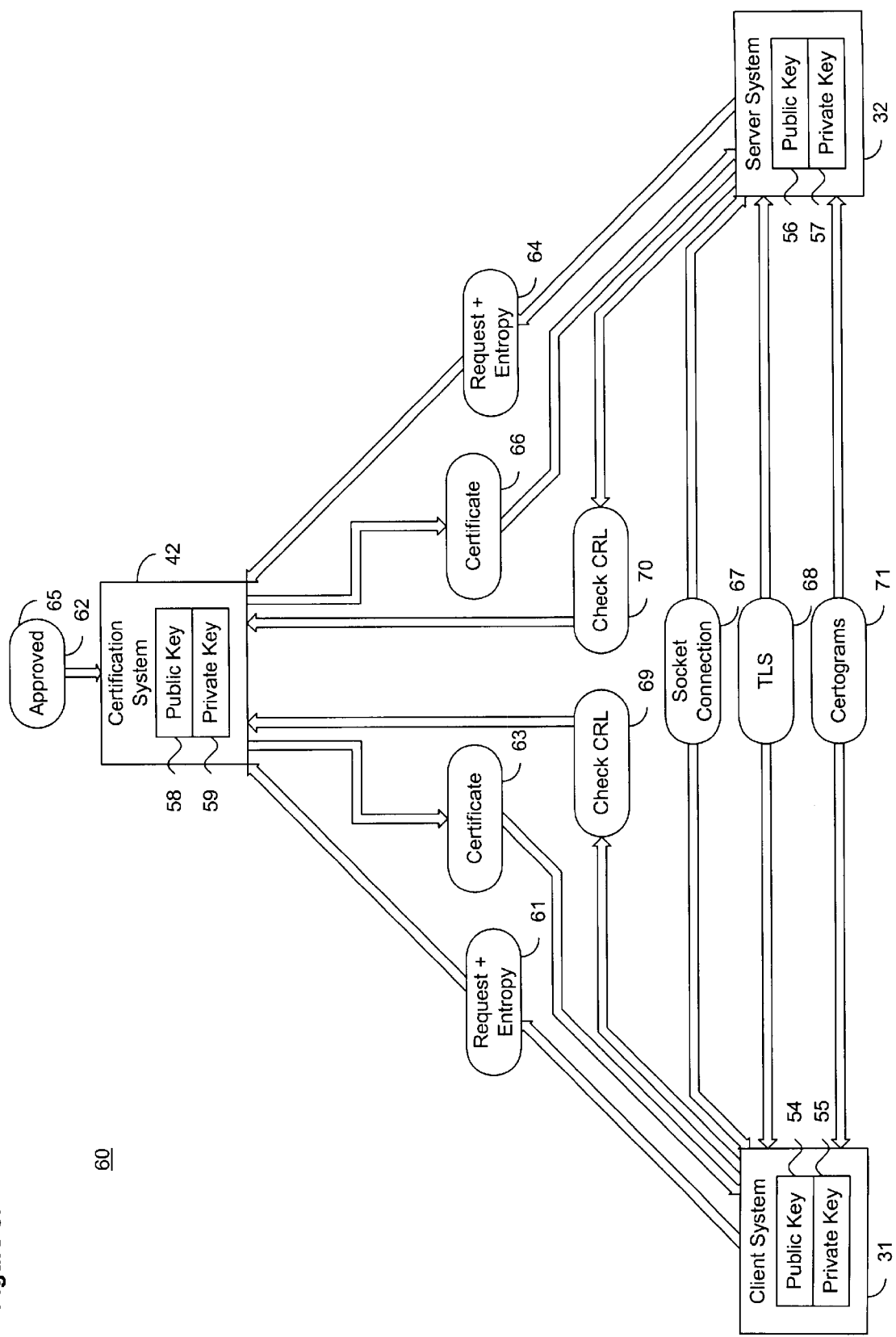
FIG. 3 is a process diagram showing the flow of requests and actions through the system of FIG. 2.

FIG. 3 is a process diagram 60 showing the flow of requests and actions through the system 30 of FIG. 2. During the initialization phase of active security, the client system 31 and server system 32 are mutually credentialed. Prior to opening authenticated communications channels, each of the systems, client system 31, server system 32, and certification server 42, must respectively generate public key 54, 56, 58 and private key 55, 57, 59 pairs. Next, both the client system 31 and external system 32 must obtain the appropriate digital certificates from the certification server 42. Thus, the client system 31 sends a request 61, including the public key 54 and entropy, to the certification server 42. Entropy is random data obtained from the client system 31 and is used to generate a unique identifier. The certification server 42 must obtain approval 62 to create a digital certificate for the client system 31. Generally, approval is a separate process operating outside of the certification sequence and could include, for example, electronic mail messages exchanged between the certification server 42 and the client system 31 confirming the digital certificate request 61. Upon the granting of approval, a digital certificate 63 is sent to the server system 31. The digital certificate 63 includes the information identifying the server system 31, the public key 54 of the server system 31 and the private key 59 of the certification server 42. The private key 59 acts as a signature of authenticity by the certification server 42. The server system 32 performs the same operations of sending a request 64, receiving approval 65, and obtaining a digital certificate 66.

Next, at run time, the client system 31 establishes a secure communications channel with the server system 32 by opening up a socket connection 67 over which a transport layer security (TLS) protocol layer 68 executes. However, prior to carrying out the exchange of certograms, both the client system 31 and server system 32 must check the certificate revocation list (CRL) 69, 70 to determine whether each of the systems is still validly certified. Assuming neither system has a revoked digital certificate, the client system 31 and server system 32 can now exchange certograms 71.

Figure 4:
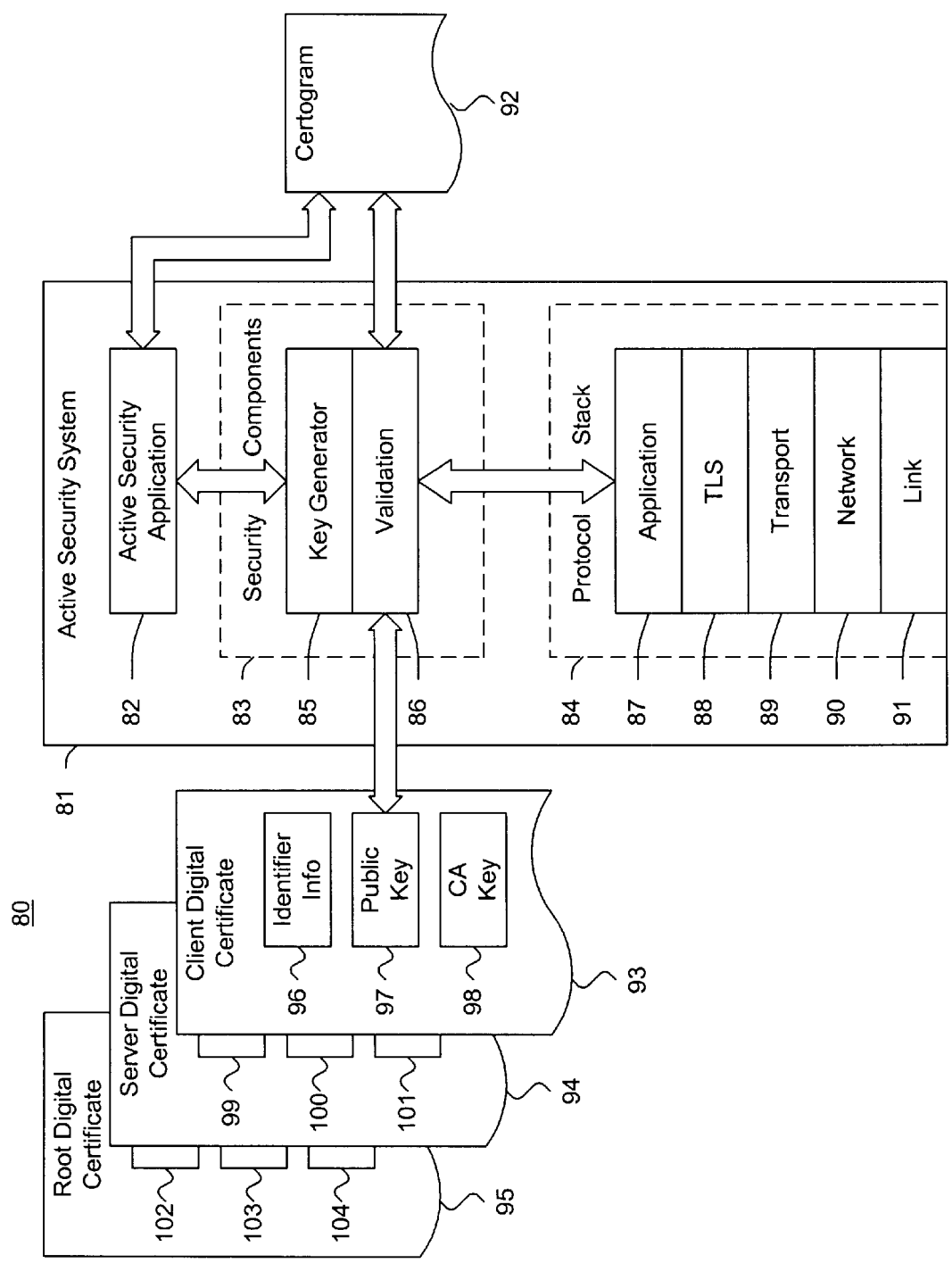
FIG. 4 is a block diagram showing the functional software modules of a generic active security system for use in the system of FIG. 2.

FIG. 4 is a block diagram showing the functional software modules 80 of a generic active security system 81 for use in the system 30 of FIG. 2. Each module is a computer program written as source code in a conventional programming language, such as C++ and Visual Basic programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are written in accordance with the Common Object Model (COM), such as described in D. Chappell, "Understanding ActiveX and OLE," Chs. 1–5, Microsoft Press (1996), the disclosure of which is incorporated herein by reference.

The active security system 81 consists of three main modules: an active security application 82, authentication components 83, and protocol stack 84. The active security application 82 is any type of security product which provides an active form of network security, such as the Net Tools Secure active security products suite, licensed by Network Associates, Inc, or passive form of network security, such as the CyberCop Scanner product suite which includes a vulnerability scanner, also licensed by Network Associates, Inc. For instance, a passive vulnerability scanner would generate pre-emptive informational messages upon the detection of a weakness or similar security concern in one of the systems operating within the active security environment. As an example, the discovery of a write-enabled root directory on a Web server would result in the generation of an informational certogram recommending that the appropriate firewall restrict access to that Web server until the security concern is alleviated. Messages are exchanged between the individual security applications using plain-text, parameterized certograms 92. Appendix A contains an application programming interface definition for use in implementing the various modules.

The security components 83 consist of a key generator 85 and a validation module 86. The key generator 85 generates a public key and private key pair (not shown), using, for example, Diffie-Hellman "shared key" or "shared secret" encryption techniques. The validation module 86 receives digital certificates from a certification server and determines whether the digital certificates are legitimate and valid. In the described embodiment, X.509 digital certificates are used and the validation module 86 validates the digital certificate by requesting verification by the certification authority. Depending upon the number of secure communications channels used, the active security system 81 stores a set of digital certificates which typically include a client digital certificate 93, server digital certificate 94, and root digital certificate 95. Each digital certificate 93, 94, 95 includes identifier information 96, 99, 102; a public key 97, 100, 103 for the owner of the digital certificate; and a private key 98, 101, 104 for the certification authority.

Finally, the protocol stack 84 is a hierarchically structured stack of standardized protocol layers which cooperatively exchange information between the various active security systems. In the described embodiment, a TCP/IP protocol stack is used and consists of a link 91, network 90, transport 89, and application 87 protocol layers. In addition, a transport layer security (TLS) protocol layer 88 is executed as part of the transport layer 89 to transparently provide a secure socket connection which includes encryption, server authentication, and trustworthy packet exchanges.

FIG. 5 is a data structure diagram showing the layout of a certogram 120 used by the system 30 of FIG. 2. Certograms are generated upon the occurrence of a network event, upon the discovery of a weakness on a system operating within the active security environment, or similar security concern, such as would be recognized by one skilled in the art. Each certogram 120 is a variable-length message consisting of attribute and value pairings. Certograms are machine-independent and extensible. Extraneous attribute/value pairs are ignored. Since the digital certificates used to authenticate one secured connection are not necessarily the same digital certificates used for subsequent certogram transmissions, certograms are replicated for each transmission between different pairs of client and server systems. By way of example, a certogram 120 can contain the following non-exhaustive list of well-known fields:

| ATTRIBUTE NAME | ATTRIBUTE DESCRIPTION |
| --- | --- |
| PRODUCT_VERSION (121) | Name and/or version of security application |
| PRODUCT_ENGINE_VERSION (121) | Security application's engine version |
| PROTOCOL_VERSION (123) | Security application's Active Security revision |
| ACTION (124) | Action suggested by the security application for the security application: NONE, EVALUATE, REPORT, BLOCK and FREE |
| TIME (125) | Time the security application constructed the certogram |
| PROTOCOL_ID (126) | Applicable network for the security application |
| VULNERABILITY_ID (127) | Security application's vulnerability index |
| SEVERITY (128) | Security application's assessment of severity |
| PORT (129) | Port threatened by this vulnerability |
| MACHINE (130) | Host on which the vulnerability was discovered |
| SERVER SYSTEM_MACHINE (131) | Server system host used to find vulnerability |
| SERVER SYSTEM_PORT (132) | Server system host's port used to find vulnerability |
| CLIENT SYSTEM_MACHINE (133) | Client system host used to find vulnerability |
| CLIENT SYSTEM_PORT (134) | Client system host's port used to find vulnerability |
| SHORT_DESCRIPTION (135) | Short (one-line) description of the vulnerability |
| VULNERABILITY_DESCRIPTION (136) | Long (multi-line) description of the vulnerability |

-continued

| ATTRIBUTE NAME | ATTRIBUTE DESCRIPTION |
|---|---|
| SECURITY_CONCERNS (137) | Short (one-line) description of the vulnerability |
| SUGGESTIONS (138) | Text describing how the vulnerability can be fixed |
| OTHER_INFORMATION_SOURCES (139) | Text describing sources of reference |
| RIGH_LEVEL_DESCRIPTION (140) | Text describing the genre of vulnerability |
| MACHINE_SIGNATURE (141) | CPU ID of the host sending this certogram |
| OWNER_NAME (142) | Name of the host sending this certogram |

In addition, other fields having particular meanings to select server systems could also be included in the certogram 120. If the certogram 120 is replicated and sent to several server systems, any unrecognized, non-well known fields are ignored by the receiving server.

Figure 6:
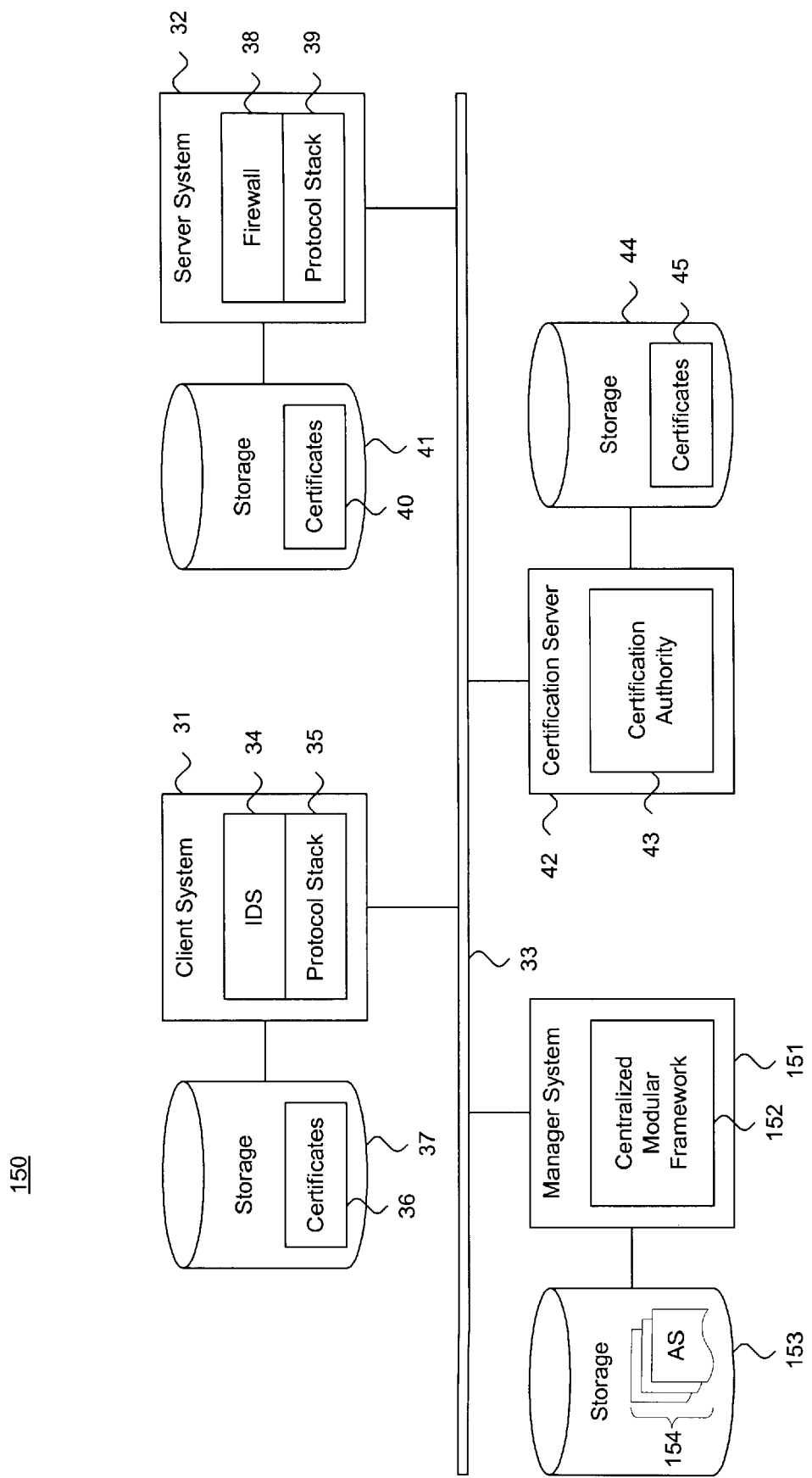
FIG. 6 is a block diagram showing a system for providing trustworthy network security concern communication using a modular network event management framework in an active security management environment in accordance with a further embodiment of the present invention.

FIG. 6 is a block diagram showing a system for providing trustworthy network security concern communication 150 using a modular network event management framework in an active security management environment in accordance with a further embodiment of the present invention. A manager system 151 is interconnected with the intranetwork 33 and functions as a centralized modular framework 152 for network event management. The manager system 151 includes a storage 153 containing the action sets 154. The modular framework 152 manages the receipt, analysis, and processing of network events based on user-defined action sets 154. The network events are received as certograms over a secure communications channel.

Each action set 154 defines relationships between network events, actions and event filters. Actions are performed by actors, that is, server active security applications, and event filters are actions which are performed after the receipt of a network event but before any corresponding actions are executed. Thus, the modular framework 152 functions as an intermediary between a client active security application which detects the occurrence of network events and recommends a suggested action and a server active security application which evaluates and potentially performs the suggested action. Note certograms can be forwarded through an arbitrarily long chain of client/server active security applications.

Each action set contains instructions in the form of suggested actions, either as received from a client active security application or as modified by the modular framework 152. In the described embodiment, six types of actors are supported, a help desk, firewall, and methods for broadcasting a network message, sending an electronic mail message (email), sending an alphanumeric page, and running a script. Other types of actors and actions are feasible. A modular network event management framework for dynamically processing network events using action sets, configuring action sets, and dynamically sensing asynchronous network events are respectively disclosed in the related, commonly-assigned U.S. patent application Ser. No. 09/467,730, filed Dec. 20, 1999, pending; and U.S. patent application Ser. No. 09/467,633, filed Dec. 20, 1999, pending; and U.S. patent application Ser. No. 09/494,234, filed Jan. 31, 2000, pending, the disclosures of which are incorporated herein by reference. An example of a commercially available modular framework 152 is the Event Orchestrator product suite also licensed by Network Associates, Inc. In addition, agents, arbiter, and actors are further described in "Event Orchestrator for Windows NT—Getting Started Guide," Rel. 1.02, Network Associates, Inc. (January 1999), the disclosure of which is incorporated herein by reference.

Figure 7A:
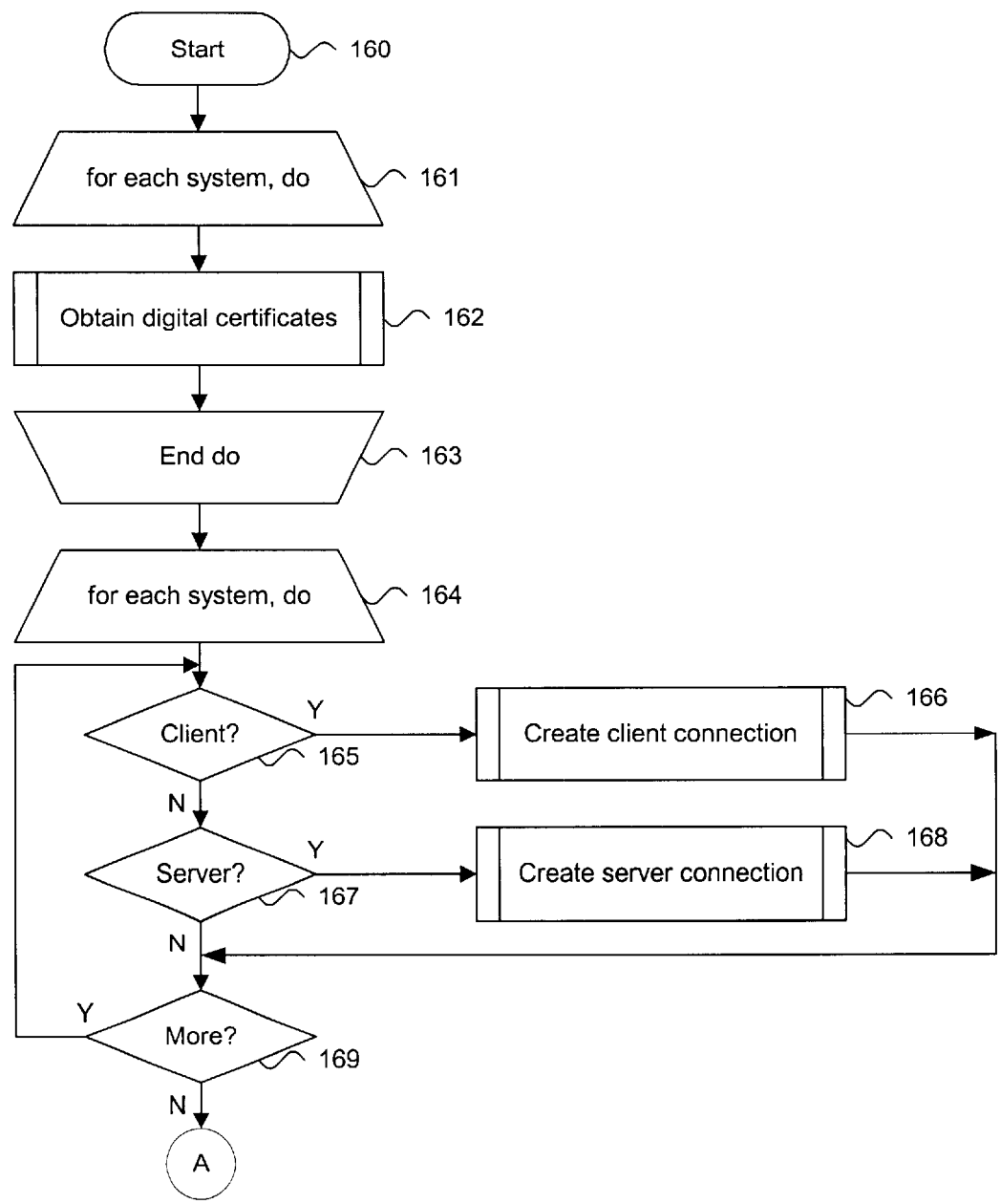
FIGS. 7A and 7B are flow diagrams showing a method for providing trustworthy network security concern communication in an active security management environment in accordance with the present invention.
Figure 7B:
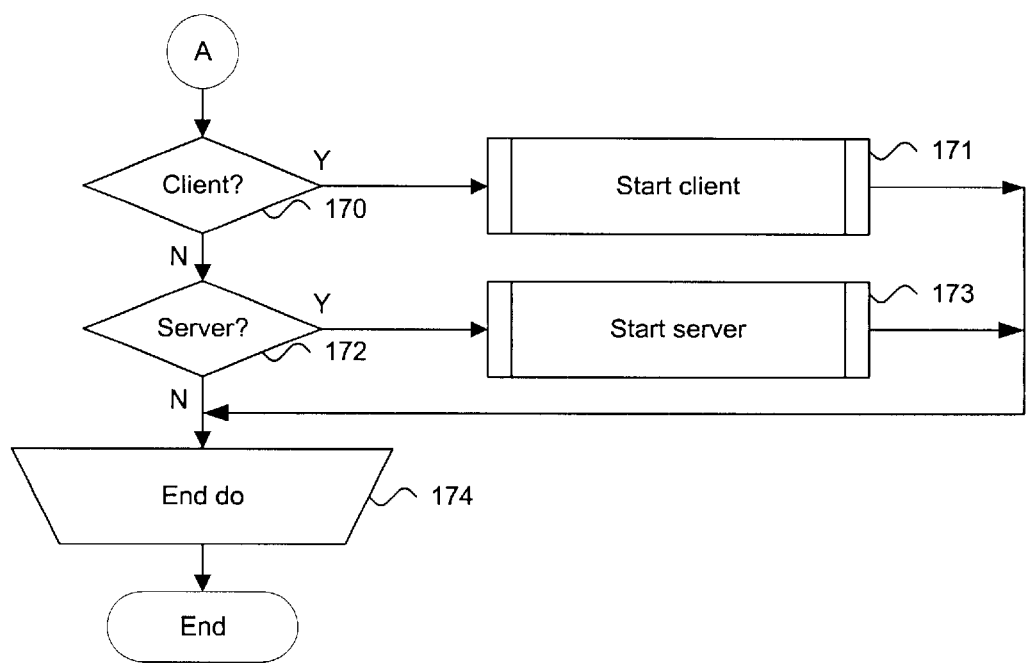

FIGS. 7A and 7B are flow diagrams showing a method for providing trustworthy network security concern communication 160 in an active security management environment in accordance with the present invention. The method operates in two basic phases. During the first phase, each of the active security systems 81 (shown in FIG. 4) obtains the appropriate digital certificates 93, 94, 95 in an iterative processing loop (blocks 161–163). During the second phase, each active security system 81 creates secure connections based on whether the system functions as a client or server and the active security system is started, also in an iterative processing loop (blocks 164–174). Other forms of flow control and processing are possible.

Thus, during the first phase, each active security system 81 is selected (block 161) and any necessary digital certificates 93, 94, 95 are obtained (block 162), as further described below with reference to FIG. 8. Iterative processing continues (block 163) for each of the remaining active security systems 81.

During the second phase, each active security system 81 is again selected (block 164). If the selected active security system 81 is a client system (block 165), a client connection is created (block 166), as further described below with reference to FIG. 8. If the selected active security system 81 is a server system (block 167), a server connection is created (block 168), as further described below with reference to FIG. 9. More client and server connections are created, as required (block 169). Once all connections have been created (block 169), each active security system 81 is started. Thus, if the active security system 81 is a client system (block 170), the client system is started (block 171), as further described below with reference to FIG. 13. Similarly, if the active security system 81 is a server system (block 172), the server system is started (block 173), as further described below with reference to FIG. 14. Iterative processing continues (block 174) for each of the remaining active security systems 81.

Figure 8:
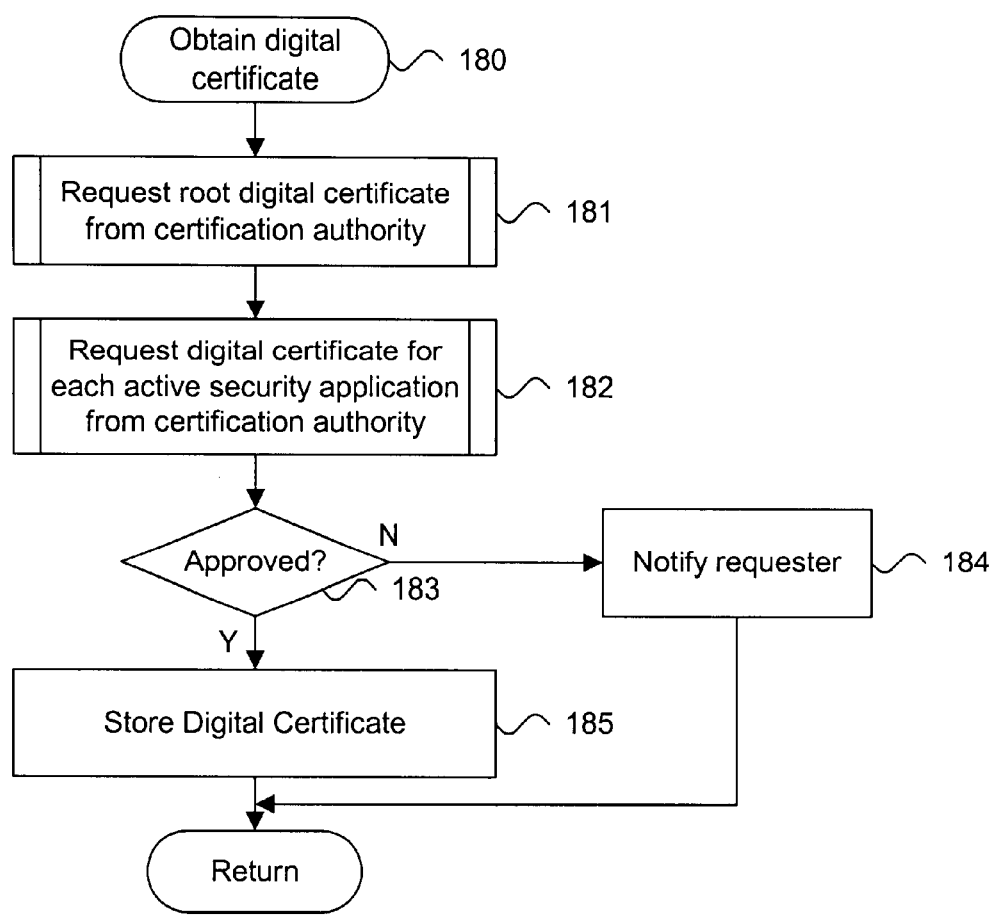
FIG. 8 is a flow diagram showing the routine for obtaining a digital certificate for use in the method of FIGS. 7A and 7B.

FIG. 8 is a flow diagram showing the routine for obtaining a digital certificate 180 for use in the method of FIGS. 7A and 7B. The purpose of this routine is to request and store a root digital certificate and a digital certificate for each active security application 82 operating on the active security system 81. First, the root digital certificate 95 (shown in FIG. 4) is requested from the certification server 42 (shown in FIG. 2) (block 181), as further described below with reference to FIG. 9. Similarly, a product digital certificate is requested from the certification server 42 for each active security application 82 (block 182), as further described below with reference to FIG. 10. The certification server need not automatically approve all requests for digital certificates. Thus, if any of the requests are not approved (block 183), the requesting active security system 81 is notified (block 184) and the routine returns. Otherwise, the approved digital certificates are stored in the appropriate storage 37, 41 and the routine returns.

Figure 9:
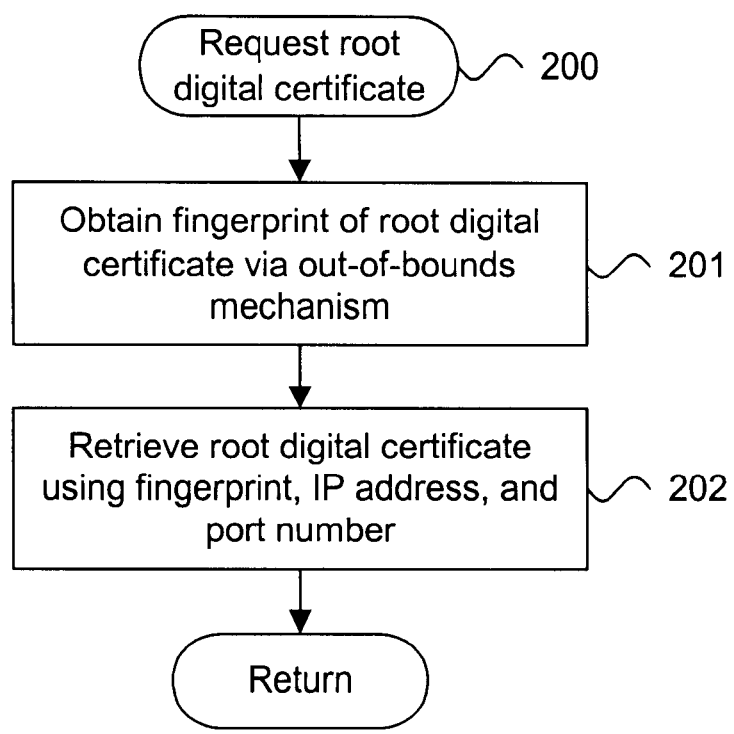
FIG. 9 is a flow diagram showing the routine for requesting a root digital certificate for use in the method of FIG. 8.

FIG. 9 is a flow diagram showing the routine for requesting a root digital certificate 200 for use in the method of FIG. 8. The purpose of this routine is to obtain the root digital certificate 95 from the certification server 42 in a manner which ensures the root digital certificate 95 is positively identified. Thus, a fingerprint of the root digital certificate 95 is obtained (block 201) via an out-of-bounds mechanism. A fingerprint is a unique identifier for the root digital certificate 95 and, in the described embodiment, is an MD5 hash. The out-of-bounds mechanism is an alternative communications channel outside the scope of the active security environment and can include electronic mail or manual communications. Once the fingerprint has been obtained, the root digital certificate 95 can be retrieved from the certification server 42 using the fingerprint and assigned the internet address and port number (block 202). The routine then returns.

Figure 10:
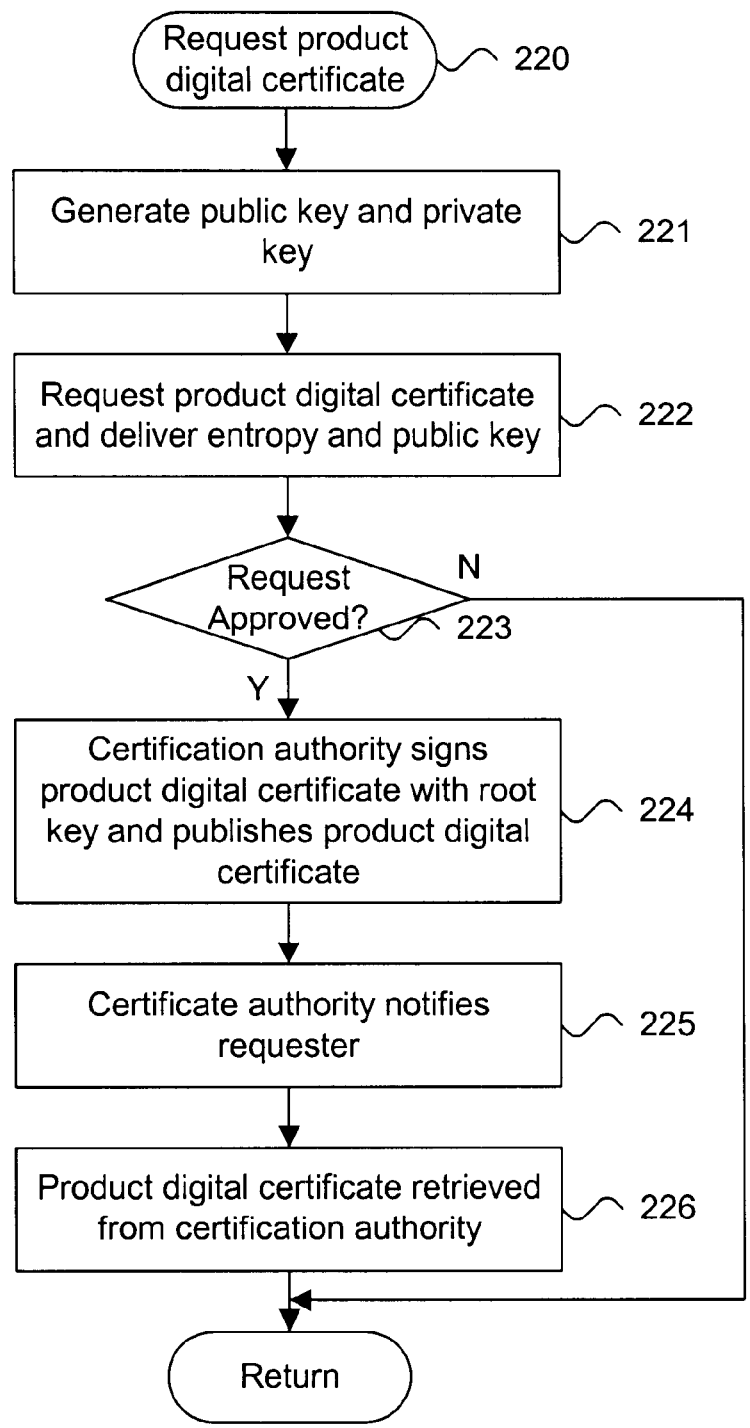
FIG. 10 is a flow diagram showing the routine for requesting a product digital certificate for use in the method of FIG. 8.

FIG. 10 is a flow diagram showing the routine for requesting a product digital certificate 220 for use in the method of FIG. 8. The purpose of this routine is to obtain a digital certificate for an active security application 82 (product) for use in establishing a secure communications channel. First, the key generator 85 (shown in FIG. 4) generates a public key and a private key for the active security system 81 (block 221). A digital certificate is requested from the certification server 42 (block 222) by sending identifying information, the public key, and entropy, as described above with reference to FIG. 3. If the request is approved (block 223), the certification authority "signs" the digital certificate by attaching the private key for the certification server 42 and publishing the digital certificate on the certification server 42 (block 224). The requesting active security application 82 is notified (block 225) and the product digital certificate is retrieved (block 226). The routine then returns.

Figure 11:
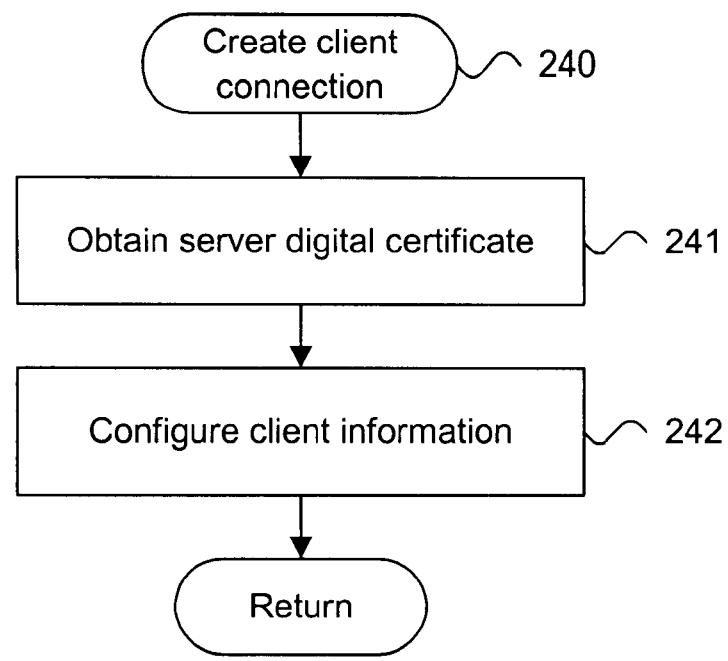
FIG. 11 is a flow diagram showing the routine for creating a client connection for use in the method of FIGS. 7A and 7B.

FIG. 11 is a flow diagram showing the routine for creating a client connection for use in the method of FIGS. 7A and 7B. The purpose of this routine is to configure an active security application 82 as a client system. First, the server digital certificate 94 (shown in FIG. 4) for the server system 32 (shown in FIG. 2) is obtained from the certification server 42 (block 241). The active security application 82 is then configured as a client (block 242), after which the routine returns.

Figure 12:
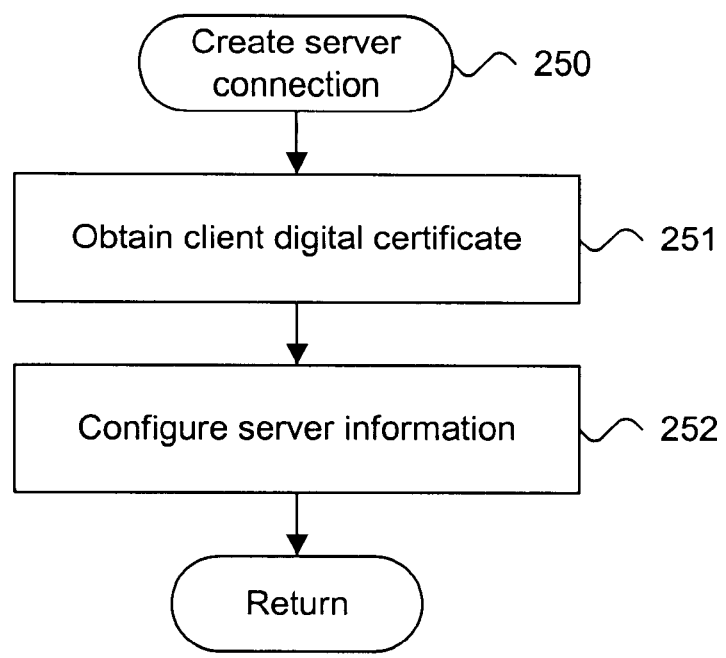
FIG. 12 is a flow diagram showing the routine for creating a server connection for use in the method of FIGS. 7A and 7B.

FIG. 12 is a flow diagram showing the routine for creating a server connection for use in the method of FIGS. 7A and 7B. The purpose of this routine is the opposite of the preceding routine and is to configure an active security application as a server system. First, the client digital certificate 93 (shown in FIG. 4) for the client system 31 (shown in FIG. 2) is obtained from the certification server 42 (block 251). The active security application 82 is then configured as a server (block 252), after which the routine returns.

Figure 13:
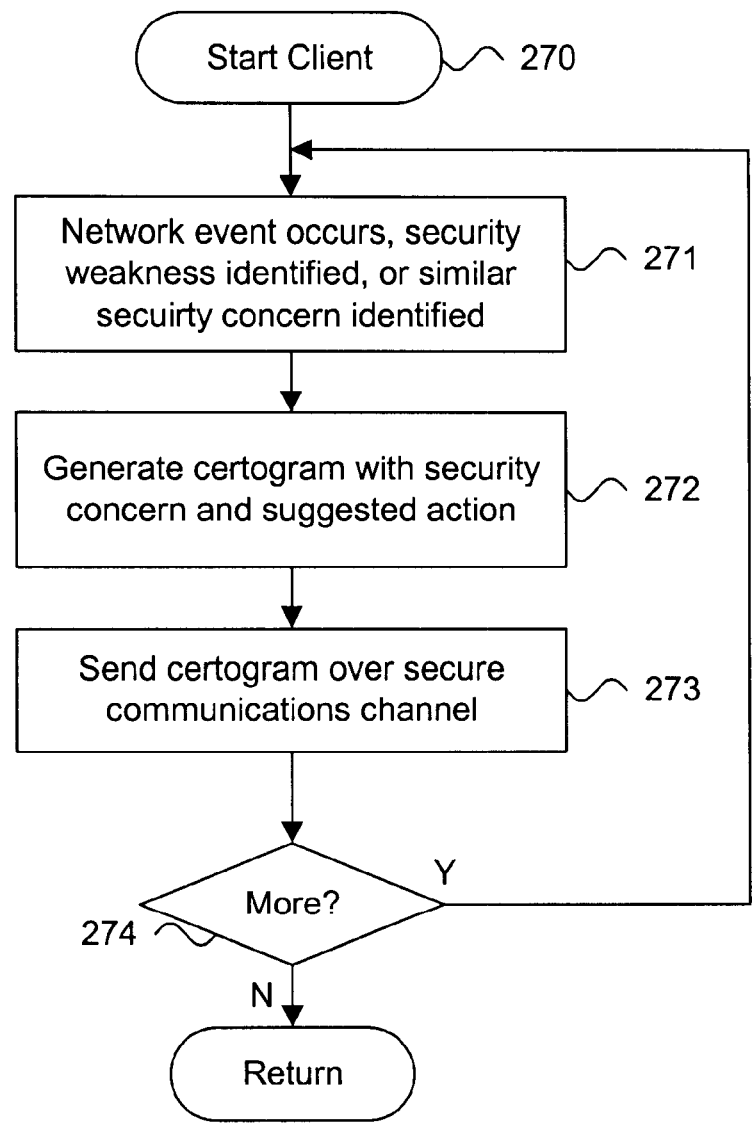
FIG. 13 is a flow diagram showing the routine for starting a client for use in the method of FIGS. 7A and 7B.

FIG. 13 is a flow diagram showing the routine for starting a client 270 for use in the method of FIGS. 7A and 7B. The purpose of this routine is to start and execute a client active security application 82. Basically, the routine generates a certogram upon the occurrence of a network security concern. First, a network event occurs, a security weakness is discovered, or a similar network concern is identified (block 271). A certogram is generated (block 272) with the network security concern and a suggested action to be taken by the server active security application 82. Note that certograms can be sent to successive server active security applications 82 and that consequently, the suggested action may not apply to the intermediate server active security applications 82. The certogram is then sent to the server active security application 82 over the secure communications channel (block 273). If more network security concerns remain (block 274), processing continues. Otherwise, the routine returns.

Figure 14:
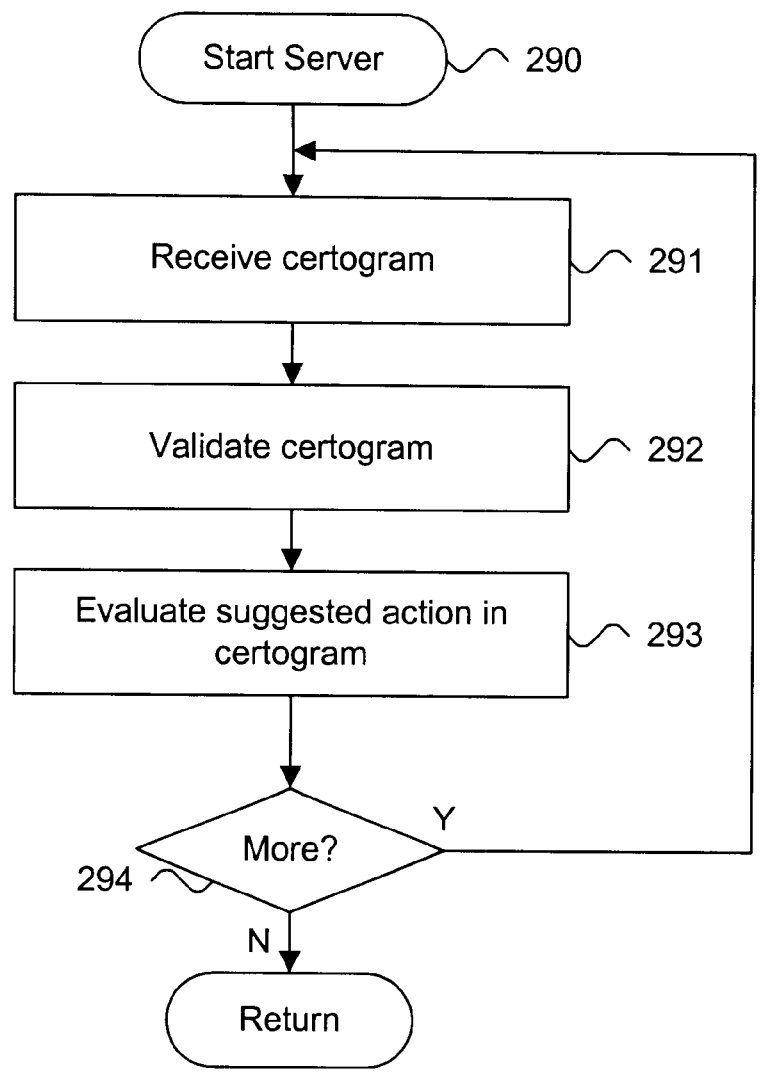
FIG. 14 is a flow diagram showing the routine for starting a server for use in the method of FIGS. 7A and 7B.

FIG. 14 is a flow diagram showing the routine for starting a server 290 for use in the method of FIGS. 7A and 7B. The purpose of this routine is to start and execute a server active security application 82. Basically, the routine processes certograms. First, a certogram is received (block 291) over the secure communications channel and is validated (block 292) using the stored client digital certificate 93 (shown in FIG. 4). The suggested action encoded in the certogram by the client active security application is evaluated (block 293) and, if necessary, action is taken. Note that although active security implies a pro-active role, a server active security application ultimately determines whether action is required, regardless of any recommended actions suggested by a client active security application. This approach allows the server active security applications to maintain control and override suggestions which might not be warranted. If more certograms remain (block 294), processing continues. Otherwise, the routine returns.

While the invention has been particularly shown and described as referenced to the embodiments thereof, those skilled in the art will understand that the foregoing and other changes in form and detail may be made therein without departing from the spirit and scope of the invention.

APPENDIX A

The Active Security API's are provided by SecureComm.dll and are defined by SecureCom.h as:
(the types _declspec(dllexport), _dec/spec(dllimport), _cdecl and definition of
HSECUREEVENT have been removed for simplicity)
SECURED PASSPHRASE CALLS INT     ppGetSecurePassphrase(LPSTR,UINT)
Description:
    Get the Active Security Passphrase entered for this session.
Parameters:
    LPSTR - pointer to a string receiving the passphrase entered through the Active Security
    Panel.
    UINT - length in bytes of the passed-in buffer including the NULL terminator.
Returns:
    The length of the passphrase copied into the passed-in buffer or −1 on failure.
INT     ppSetSecurePassphrase(LPSTR,BOOL)
Description:
    Set the Active Security Passphrase entered for this session.
Parameters:
    LPSTR - pointer the NULL terminated string of the new passphrase to set for this Active
    Security Session.

APPENDIX A-continued

BOOL - set to:
                TRUE - you want this passphrase to be stored across sessions. The passphrase will be stored in plain text in the Registry.
                FALSE - (default) the passphrase is saved only for this Session. It will be stored in global memory address referenced in the GAT.
Returns:
        The length of the passphrase copied into the global memory buffer or −1 on failure.
void     ppDelSecurePassphrase()
Description:
        Delete the Active Security Passphrase for this session.

CLIENT COMMUNICATION CALLS

BOOL    clStartClients(LPCSTR)
Description:
        Start the Client Session.
Parameters:
        A string representing the owner-component found in SecureComm.h), e.g., "CyberCop Scanner".
Returns:
        TRUE - success
        FALSE - only if failed to allocate enough memory
void     clStopClients()
Description:
        Stop the Client session. Closes down all sending connections.
void     dStopClientsTimeout(int)
Description:
        Stop the Client session but waits up to 5 mins to close down all sending connections.
Parameters:
        ignored
int       clIsQueueEmpty()
Description:
        Asks if the Client's send-queue is empty or not.
Returns:
        TRUE - the queue is empty (nothing is waiting to be sent)
        FALSE- the queue is not empty
BOOL    clSendEvent(int, HSECUREEVENT)
Description:
        Sends the secure event (a Certogram most likely) specified by the HSECUREEVENT parameter to the Servers specified by connection number.
Parameters:
        int - the integer representing the Active Security Connection # or -1 for all known clients.
        HSECUREEVENT- a handle to a "secure event" (a Certogram) created by seCreate() (below)
Returns:
        TRUE - the Certogram was posted to send
        FALSE - the Certogram was not posted (not added to the Client's send queue(s)).

SERVER COMMUNICATION CALLS

BOOL              srStartServer(LPCSTR)
Description:
        Start the Server Session.
Parameters:
        A string representing the owner-component found in SecureComm.h), e.g., "CyberCop Scanner".
Returns:
        TRUE - success (Server process has started)
        FALSE - only if failed to allocate enough memory
void             srStopServer()
Description:
        Stop the currently started Server (w/o waiting to empty the queue).
int              srIsQueueEmpty()
Description:
        Query if the Server still has Certograms it has not delivered to the local Active Security process that owns the Server.
Returns:
        (cast this return to a BOOLean)
        TRUE - the Server queue is empty
        FALSE - Server queue is not empty
HSECUREEVENT           srGetEvent(int)
Description:
        Ask the Server to hand-over the next Certogram in his queue.
Parameters:
        Int - in milliseconds how long you're willing to wait for a Certogram to be delivered. Default is 300 ms.
Returns:
        A handle to an HSECUREEVENT or NULL on failure/no Certogram within the time limit. You will need delete the memory from any valid returned HSECUREEVENT with seClose().

APPENDIX A-continued

EVENT (Certogram) CREATION & PARSING CALLS

HSECUREEVENT    seCreate(LPVOID, UINT)
Description:
  Create an Event object from a "raw" data buffer.
Parameters:
  LPVOID - the pointer to the raw data buffer
  UINT - the maximum length the data buffer is valid for if 0 then we go until we find a NULL-terminator.
Returns:
  A handle to a valid Event-object to be used in subsequent calls or 0 on failure.
LPVOID    seGetEvent(HSECUREEVENT,UINT&)
Description:
  Return a data pointer to a "raw" data object (un-structured) which is the entire data-stream.
Parameters:
  HANDLE - to SecureComm "Event instance" returned from seCreate()
  LPVOID to raw data buffer - this is just a pointer, not a copy
Returns:
  the length of the buffer in the UINT parameter
  the resultant LPVOID, a pointer to a NULL terminated data stream
LPCSTR    seGetAttrStr(HSECUREEVENT,eATTRIBUTES)
Description:
  Simply returns the string of the passed-in attribute.
Parameters:
  HSECUREEVENT - the handle to a secure event from seCreate()
  ENUM - specified in SecureComm.h as an attribute
Returns:
  An LPCSTR containing the string corresponding to the ENUM passed-in.
LPCSTR    seGetAVP(HSECUREEVENT,eATTRIBUTES,LPCSTR)
Description:
  gets the actual value (in the specified Certogram) for the specified attribute passed-in.
Parameters:
  HSECUREEVENT - the handle to a secure event from seCreate()
  ENUM - specified in SecureComm.h as an attribute
  LPCSTR - (custom attribute - use only w/ENUM = = eCUSTOM)
Returns:
  The value for the specific attribute.
BOOL    seSetAVP(HSECUREEVENT,eATTRIBUTES,LPCSTR,LPCSTR)
Description:
  sets the actual value (in the specified Certogram) for the specified attribute passed-in.
Parameters:
  HSECUREEVENT- the handle to a secure event from seCreate()
  ENUM - specified in SecureComm.h as an attribute
  LPCSTR - the value to set for this particular attribute
  LPCSTR - (custom attribute - use only w/ENUM = = eCUSTOM)
Returns:
  The value for the specific attribute.
VOID  seClose(HSECUREEVENT)
Description:
  Destroy the memory associated with this secure event.
Parameters:
  The handle to the secure event you want destroyed (created by seCreate())

What is claimed is:

1. A system for providing trustworthy network security concern communication in an active security management environment, comprising:
 a client system storing a digital certificate comprising a validated server identifier for a server system on a client system, wherein the server system is a modular network event management framework system, further comprising:
  a client security application generating a certogram upon the occurrence of a network security concern within the active security management environment which encloses a notification of the network security concern occurrence and a suggested action responsive thereto within the certogram;
 a communications session established between the client system and the server system comprising a secure socket connection authenticating each of the client system and the server system using the stored client digital certificate and the stored server digital certificate;
 the server system storing a digital certificate comprising a validated client identifier for the client system on the server system, further comprising:
  a server security application processing the certogram on the server system, including a validation module validating the certogram using the validated client identifier stored in the client digital certificate, the server security application evaluating the network security concern notification and the suggested action enclosed within the validated certogram;
  one or more action sets maintained on the modular network event management framework system, at least one of which associates one of the network security concerns with at least one suggested action to be performed by an actor system;
 the actor system storing a digital certificate comprising a validated actor identifier for an actor system on the modular network event management framework system;
 the modular network event management framework system storing a digital certificate comprising a validated modular network event management framework system identifier for the modular network event management framework system on the actor system, further comprising:
- a generation module generating a second certogram, including retrieving the action set associated with the network security concern which occurred and enclosing a notification of the network security concern occurrence and the at least one suggested action in the action set within the second certogram; and
- the actor system further comprising an active security application processing the certogram, including a validation module validating the certogram using the validated modular network event management framework system identifier stored in the modular network event management framework system digital certificate and evaluating the network security concern notification and the suggested action enclosed within the second validated certogram.

2. A system according to claim 1, wherein both the server digital certificate and the client digital certificate contain a signature by a trusted root entity, further comprising:
- the client system storing the client digital certificate;
- the server system storing the server digital certificate; and
- each of the client system and the server system authenticating the communications session using the client digital certificate and the server digital certificate stored on each of the client system and the server system.

3. A system according to claim 2, further comprising:
- the server system further comprising a comparison module comparing the trusted root entity signature stored in the server digital certificate on the server system to the trusted root entity signature stored in the client digital certificate; and
- the client system further comprising a comparison module comparing the trusted root entity signature stored in the client digital certificate on the client system to the trusted root entity signature stored in the server digital certificate.

4. A system according to claim 1, further comprising:
- a certificate revocation list maintained on a certificate authority server, the certificate revocation list comprising a list of digital certificates which are no longer valid; and
- the server system determining the validity of the client digital certificate by accessing the certificate revocation list.

5. A system according to claim 5, further comprising:
- an action set stored into a database interfaced with the modular network event management framework system;
- at least one network security concern associated with the client system;
- at least one action embedded into an action set; and
- a mapping table in the database storing the association for the at least one network security concern and the embedding of the at least one action.

6. A system according to claim 1, further comprising:
- for each of the server system and the client system, the digital certificate obtained from a certificate authority server via a communications channel operating outside of the active security management environment.

7. A system according to claim 1, further comprising:
- a certificate authority server hierarchically structuring the digital certificates for the server system and the client system by generating each of the digital certificates from a root digital certificate maintained on a certificate authority server.

8. A system according to claim 1, wherein for each of the server system and the client system, the validated server identifier and the validated client identifier are both generated from at least one of a network address, a port address, media access controller address, a processor serial number, and randomly generated data.

9. A system according to claim 1, wherein the digital certificate is an X.509-compliant digital certificate.

10. A method for providing trustworthy network security concern communication in an active security management environment comprising:
- storing a digital certificate comprising a validated server identifier for a server system on a client system, wherein the server system is a modular network event management framework system;
- storing a digital certificate comprising a validated client identifier for the client system on the server system;
- establishing a communications session between the client system and the server system comprising a secure socket connection authenticating each of the client system and the server system using the stored client digital certificate and the stored server digital certificate:
- generating a certogram upon the occurrence of a network security concern within the active security management environment which encloses a notification of the network security concern occurrence and a suggested action responsive thereto within the certogram;
- processing the certogram on the server system, including validating the certogram using the validated client identifier stored in the client digital certificate and evaluating the network security concern notification and the suggested action enclosed within the validated certogram;
- maintaining one or more action sets on the modular network event management framework system, at least one of which associates one of the network security concerns with at least one suggested action to be performed by an actor system;
- storing a digital certificate comprising a validated actor identifier for an actor system on the modular network event management framework system;
- storing a digital certificate comprising a validated modular network event management framework system identifier for the modular network event management framework system on the actor system;
- generating a second certogram, comprising:
  - retrieving the action set associated with the network security concern which occurred; and
  - enclosing a notification of the network security concern occurrence and the at least one suggested action in the action set within the second certogram; and
- processing the certogram, including validating the certogram using the validated modular network event management framework system identifier stored in the modular network event management framework system digital certificate and evaluating the network security concern notification and the suggested action enclosed within the second validated certogram.

11. A method according to claim 10, wherein both the server digital certificate and the client digital certificate contain a signature by a trusted root entity, further comprising:

storing the client digital certificate on the client system;
storing the server digital certificate on the server system; and
authenticating the communications session using the client digital certificate and the server digital certificate stored on each of the client system and the server system.

12. A method according to claim 11, further comprising:
comparing the trusted root entity signature stored in the server digital certificate on the server system to the trusted root entity signature stored in the client digital certificate on the server system; and
comparing the trusted root entity signature stored in the client digital certificate on the client system to the trusted root entity signature stored in the server digital certificate on the client system.

13. A method according to claim 10, further comprising:
maintaining a certificate revocation list on a certificate authority server, the certificate revocation list comprising a list of digital certificates which are no longer valid; and
determining the validity of the client digital certificate by accessing the certificate revocation list.

14. A method according to claim 10, further comprising:
storing an action set into a database interfaced with the modular network event management framework system;
associating at least one network security concern with the client system;
embedding at least one action into an action set; and
storing the association for the at least one network security concern and the embedding of the at least one action into a mapping table in the database.

15. A method according to claim 10, further comprising:
for each of the server system and the client system, obtaining the digital certificate from a certificate authority server via a communications channel operating outside of the active security management environment.

16. A method according to claim 10, further comprising:
hierarchically structuring the digital certificates for the server system and the client system by generating each of the digital certificates from a root digital certificate maintained on a certificate authority server.

17. A method according to claim 10, wherein for each of the server system and the client system, the validated server identifier and the validated client identifier are both generated from at least one of a network address, a port address, media access controller address, a processor serial number, and randomly generated data.

18. A method according to claim 10, wherein the digital certificate is an X.509-compliant digital certificate.

19. A computer-readable storage medium holding code for providing trustworthy network security concern communication in an active security management environment, comprising:
storing a digital certificate comprising a validated server identifier for a server system on a client system wherein the server system is a modular network event management framework system;
storing a digital certificate comprising a validated client identifier for the client system on the server system;
establishing a communications session between the client system and the server system comprising a secure socket connection authenticating each of the client system and the server system using the stored client digital certificate and the stored server digital certificate;
generating a certogram upon the occurrence of a network security concern within the active security management environment which encloses a notification of the network security concern occurrence and a suggested action responsive thereto within the certogram;
processing the certogram on the server system including validating the certogram using the validated client identifier stored in the client digital certificate and evaluating the network security concern notification and the suggested action enclosed within the validated certogram;
maintaining one or more action sets on the modular network event management framework system, at least one of which associates one of the network security concerns with at least one suggested action to be performed by an actor system;
storing a digital certificate comprising a validated actor identifier for an actor system on the modular network event management framework system;
storing a digital certificate comprising a validated modular network event management framework system identifier for the modular network event management framework system on the actor system;
generating a second certogram, comprising:
retrieving the action set associated with the network security concern which occurred; and
enclosing a notification of the network security concern occurrence and the at least one suggested action in the action set within the second certogram; and
processing the certogram, including validating the certogram using the validated modular network event management framework system identifier stored in the modular network event management framework system digital certificate and evaluating the network security concern notification and the suggested action enclosed within the second validated certogram.

20. A storage medium according to claim 19, wherein both the server digital certificate and the client digital certificate contain a signature by a trusted root entity, further comprising:
storing the client digital certificate on the client system;
storing the server digital certificate on the server system; and
authenticating the communications session using the client digital certificate and the server digital certificate stored on each of the client system and the server system.

21. A storage medium according to claim 20, further comprising:
comparing the trusted root entity signature stored in the server digital certificate on the server system to the trusted root entity signature stored in the client digital certificate on the server system; and
comparing the trusted root entity signature stored in the client digital certificate on the client system to the trusted root entity signature stored in the server digital certificate on the client system.

22. A storage medium according to claim 19, further comprising:
- maintaining a certificate revocation list on a certificate authority server, the certificate revocation list comprising a list of digital certificates which are no longer valid; and
- determining the validity of the client digital certificate by accessing the certificate revocation list.

23. A storage medium according to claim 19, further comprising:
- storing an action set into a database interfaced with the modular network event management framework system;
- associating at least one network security concern with the client system;
- embedding at least one action into an action set; and
- storing the association for the at least one network security concern and the embedding of the at least one action into a mapping table in the database.

24. A storage medium according to claim 19, further comprising:
- for each of the server system and the client system, obtaining the digital certificate from a certificate authority server via a communications channel operating,outside of the active security management environment.

25. A storage medium according to claim 19, further comprising:
- hierarchically structuring the digital certificates for the server system and the client system by generating each of the digital certificates from a root digital certificate maintained on a certificate authority server.

* * * * *

UNITED STATES PATENT AND TRADEMARK OFFICE
CERTIFICATE OF CORRECTION

PATENT NO. : 6,611,869 B1  Page 1 of 1
APPLICATION NO. : 09/540821
DATED : August 26, 2003
INVENTOR(S) : Eschelbeck et al.

It is certified that error appears in the above-identified patent and that said Letters Patent is hereby corrected as shown below:

col. 18, line 14 replace "environment" with --environment,--;
    col. 18, line 26 replace "certificate:" with --certificate;--;
    col. 19, line 58 replace "system" with --system,--;
    col. 20, line 10 replace "system" with --system,--;
    col. 22, line 9 replace "operating,outside" with --operating outside--.

Signed and Sealed this

Sixteenth Day of February, 2010

David J. Kappos
*Director of the United States Patent and Trademark Office*